US012058493B2

(12) United States Patent
Pedersen et al.

(10) Patent No.: US 12,058,493 B2
(45) Date of Patent: Aug. 6, 2024

(54) HEARING DEVICE COMPRISING AN OWN VOICE PROCESSOR

(71) Applicant: Oticon A/S, Smørum (DK)

(72) Inventors: Michael Syskind Pedersen, Smørum (DK); Jan M. De Haan, Smørum (DK); Nels Hede Rohde, Smørum (DK); Angela Josupeit, Smørum (DK); Sigurdur Sigurdsson, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

(21) Appl. No.: 17/742,132

(22) Filed: May 11, 2022

(65) Prior Publication Data

US 2022/0272462 A1 Aug. 25, 2022

Related U.S. Application Data

(62) Division of application No. 17/062,097, filed on Oct. 2, 2020, now Pat. No. 11,356,783.

(51) Int. Cl.
*H04R 25/00* (2006.01)

(52) U.S. Cl.
CPC ............. *H04R 25/43* (2013.01); *H04R 25/30* (2013.01); *H04R 2225/41* (2013.01)

(58) Field of Classification Search
CPC ..... H04R 25/30; H04R 25/43; H04R 2225/41
See application file for complete search history.

(56) References Cited

U.S. PATENT DOCUMENTS

| | | | | |
|---|---|---|---|---|
| 6,738,485 | B1 | 5/2004 | Boesen | |
| 2002/0166557 | A1 | 11/2002 | Cooper | |
| 2011/0093262 | A1 | 4/2011 | Wittke et al. | |
| 2017/0157435 | A1* | 6/2017 | Choi | A41D 1/005 |
| 2021/0142465 | A1* | 5/2021 | Donoghue | G06V 10/40 |
| 2021/0386141 | A1* | 12/2021 | Chun | A62B 18/10 |

FOREIGN PATENT DOCUMENTS

| | | | |
|---|---|---|---|
| EP | 3 588 981 | A1 | 1/2020 |
| EP | 3 709 115 | A1 | 9/2020 |
| EP | 3 726 856 | A1 | 10/2020 |
| WO | WO 2021/138648 | A1 | 7/2021 |

OTHER PUBLICATIONS

Extended European Search Report for European Application No. 21199395.1, dated May 30, 2022.
Goldin et al., "How Do Medical Masks Degrade Speech Reception?" The Hearing Review, Apr. 1, 2020, pp. 1-9.

* cited by examiner

*Primary Examiner* — Suhan Ni
(74) *Attorney, Agent, or Firm* — Birch, Stewart, Kolasch & Birch, LLP

(57) ABSTRACT

A hearing device, e.g. a hearing aid or a headset, configured to be worn at or in an ear of a user, the hearing device comprising at least one input transducer for converting a sound in an environment of the hearing device to at least one electric input signal representing said sound; an own voice detector configured to estimate whether or not, or with what probability, said sound originates from the voice of the user, and to provide an own voice control signal indicative thereof, a face mask detector configured to estimate whether or not, or with what probability, said user wears a face mask while speaking, and to provide face mask control signal indicative thereof. A method of operating a hearing device is further disclosed. Thereby an improved hearing aid or headset may be provided.

17 Claims, 10 Drawing Sheets

HEARING DEVICE COMPRISING AN OWN VOICE PROCESSOR

This application is a Divisional of co-pending application Ser. No. 17/062,097, filed on Oct. 2, 2020, which is hereby expressly incorporated by reference into the present application.

BACKGROUND

The present application deals with a method for detecting own voice while wearing a face mask or face protection.

Recently it has become more common among people to wear a face mask. A face mask alters the acoustic properties while a user is talking, and the sound is picked up by e.g. a hearing instrument, a bearable or a headset. Own voice pick-up and own voice detection is important for hands free telephony and for keyword spotting. It is thus important to adapt to the changed acoustic conditions while the person is wearing a face mask. The present disclosure relates to a hearing device worn by a user, and to the detection of whether or not the user wears a face mask or the like, and/or to a possible use of such fact.

SUMMARY

A Hearing Device, e.g. a Hearing Aid or a Headset:

In an aspect of the present application, a hearing device, e.g. a hearing aid or a headset, configured to be worn at or in an ear of a user is provided. The hearing device comprises

- at least one input transducer for converting a sound in an environment of the hearing device to at least one electric input signal representing said sound;
- an own voice detector configured to estimate whether or not, or with what probability, said sound originates from the voice of the user, and to provide an own voice control signal indicative thereof.

The hearing device may further comprise, a face mask detector configured to estimate whether or not, or with what probability, said user wears a face mask while speaking, and to provide face mask control signal indicative thereof.

Thereby an improved hearing aid may be provided/.

The own voice detector and the face mask detector may be implemented as separate functional entities or integrated into one functional entity.

The own voice detector may be implemented in a lot of ways known in the art, see e.g. EP3588981A1.

The face mask detector may to some extent be based on the same type of features as is used for own voice detection, e.g. spectral features, acoustic differences between the microphone signals picked up by differently located microphones during own voice, etc. The features may be applied to a decision block (e.g. a neural network trained on features derived from speech data (e.g. own voice data with or without face mask)). Or the features may solely be based on data derived inside a neural network, see e.g. FIG. 2E.

The hearing device may e.g. comprise a feature extractor configured to identify acoustic features in the at least one electric input signals indicative of the user's own voice. The acoustic features may e.g. be or comprise or relate to the electric input signals captured by the hearing device or signals derived therefrom, e.g.:

- Magnitude or power spectrum of the electric input signals, or of one or more signals derived therefrom,
- Phase difference between the electric input signals.
- Relative transfer functions between the input transducers (e.g. both magnitude and phase),

- Beamformed signals, or signals derived therefrom (such as signals provided by own voice cancelling beamformers, e.g. derived with and without face mask), cf, e.g. FIG. 2E.

The acoustic features may be derived from electric input signals in a binaural setup.

The hearing device may e.g. comprise memory wherein reference values of said acoustic features extracted from said at least one electric input signal when the user wears the hearing device and speaks, while not wearing a face mask, are stored. Reference values may e.g. include reference values of magnitude or power spectrum, e.g. as shown in FIG. 3, or equivalent, recorded while the user (or other person, or model) wears the hearing device and speaks, e.g. with and without a face mask.

The hearing device may comprise a datalogger (e.g. the memory) wherein detected values of the own voice control signal (OV) and/or face mask control signal (FM) and/or own voice and face mask (OV+FM) are logged over time, e.g. as a counter every time OV or FM is detected.

The hearing device may e.g. comprise memory wherein differences in reference values of said acoustic features extracted from said at least one electric input signal when the user wears the hearing device and speaks, while wearing and while not wearing a face mask, are stored (see e.g. FIG. 5. Thereby a simple comparison of currently extracted acoustic features or the at least one electric input signal while the user speaks, as e.g. indicated by the own voice control signal, with the reference values enables the detection of whether or not the user wears a face mask.

The hearing device may e.g. comprise a signal processor for processing said at least one electric input signal, or one or more signals based thereon, and to provide a processed signal. The signal processor may be configured to apply one or more processing algorithms to an input signal (e.g. the at least one electric input signal, or one or more signals based thereon). The one or more processing algorithms may comprise a noise reduction algorithm for emphasizing a target signal in the environment sound, a compressive amplification algorithm for applying a frequency and level dependent gain to the input signal, a feedback control algorithm for controlling feedback from an output transducer to the at least one input transducer, etc.

The hearing device may e.g. comprise an output transducer for converting an electric output signal to stimuli perceivable by the user as sound. The output signal may be the processed signal from the signal processor. The output transducer may comprise a loudspeaker for providing stimuli as sound vibrations in air, a vibrator for providing stimuli as bone conducted sound vibrations, or an implanted multi-electrode for providing the stimuli as electric stimuli directly to the cochlear nerve of the user.

The signal processor may be configured to control processing of the at least one electric input signal, or one or more signals based thereon in dependence of the face mask control signal. The signal processor may be configured to control processing of the at least one electric input signal in dependence of the face mask control signal as well as of the own voice control signal.

The hearing device may comprise at least two input transducers providing at least two electric input signals.

The hearing device may comprise an own voice beamformer configured to provide an estimate of the voice of the user in dependence of the at least two electric input signals and configurable beamformer weights of the own voice beamformer. The estimate of the voice of the user (UOV, the beamformed signal) may be expressed as $UOV(k)=W_1(k)\cdot IN_1+W_2(k)\cdot IN_2$.

The signal processor may be configured to process the estimate of the voice of the user in dependence of the face mask control signal, and to provide an improved estimate of the voice of the user.

The signal processor may be configured to modify the frequency shape of the user's own voice in dependence of the face mask control signal and to provide the improved estimate of the voice of the user. The frequency shape of the user's own voice may be modified in order to provide a more natural own voice—both for the user and for a listener of another device (e.g. for hands-free telephony in a hearing aid or for use in a headset where the user's own voice is transmitted to 'fare end listener'). In other words, the signal processor may be configured to compensate for the frequency shaping performed by the face mask.

The hearing device may comprise a transceiver configured to transmit and/or receive audio signals from another device or system. The hearing device may—e.g. in a particular communication mode of operation—be configured to transmit the estimate of the voice of the user or the improved estimate of the voice of the user to another device.

The hearing device may comprise a keyword detector configured to identify a specific keyword of key phrase in the at least one electric input signal or a signal derived therefrom in dependence of the own voice control signal and the face mask control signal. In a keyword spotting system where a keyword or a wake word is detected while the user is talking, the presence or absence of a face mask may as well be taking into account e.g. by compensating for the spectral shape of the input signal to a keyword detector such that the spectral properties are similar both for an own voice signal both in presence and in absence of a face mask. Alternatively, training the detector using signals both with and without the person wearing a face mask. The keyword detector may be configured to identify a specific keyword of key phrase in the at least one electric input signal or a signal derived therefrom in dependence of said improved estimate of the voice of the user.

The hearing device may comprise a voice control interface configured to control functionality of the hearing device by predefined spoken commands, when detected by said keyword detector. The voice control interface may be configured to transmit a specific keyword, e.g. a wake-word fora specific application, e.g. fora personal digital assistant, e.g. 'Alexa', or 'Siri', or 'Google Now', to another device.

The hearing device may comprise or be connectable to a user interface allowing the user to indicate a specific kind of face mask or face protection that the user may occasionally wear. The user may—via the user interface-indicate his or her preferred type of face mask or face protection, e.g. selectable between a surgical mask, a face mask of a specific form, material and/or layer thickness, etc., a standardized mask (e.g. EN14683·N95·KN95, etc.).

The hearing device may be configured to identify a current location or receive information about a current location from another device and configured to trigger a reminder regarding whether or not a user is currently wearing a face mask based on the face mask control signal. A reminder may e.g. be issued, if the user is not wearing a face mask at places, where is advantageous or required to wear a face mask. The reminder may e.g. be issued as an audio feedback played through the hearing device or via a smart phone, smart watch or similar. The reminder may be triggered based on the user's location, e.g. outside the user's home, in public transportation or in shopping areas.

Parameters related to noise reduction and/or clarity of voice may be changed, based on the face mask control signal. Wearing a face mask may indicate that other people too are wearing a mask, hereby making other voices more unclear.

The hearing device may be configured to provide that the own voice detector reacts faster than the face mask detector, because own voice changes much faster than the person is taking a mask on and off. In other words, a face mask detection can be based on more input data than an own voice detection. Hereby the face mask detector may be configured to react slower than the own voice detector.

The detection of a person wearing a face mask may be asynchronous, i.e. the hearing device may be configured to react faster (e.g. with a change of mode, or parameters, e.g. related to noise reduction of voice frequency shaping) when it is detected that the face mask has been removed, going into a 'normal mode' compared to going into a 'face mask mode'.

The own voice detector and/or the face mask detector may be fully or partially implemented using a learning algorithm, e.g. a trained neural network, e.g. a deep neural network. The feature extractor may e.g. be fully or partially implemented using a learning algorithm.

The hearing device may e.g. be constituted by or comprise a headset, an air-conduction type hearing aid, a bone-conduction type hearing aid, a cochlear implant type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing aid. The direct electric input signal may represent or comprise an audio signal and/or a control signal and/or an information signal. The hearing aid may comprise demodulation circuitry for demodulating the received direct electric input to provide the direct electric input signal representing an audio signal and/or a control signal e.g. for setting an operational parameter (e.g. volume) and/or a processing parameter of the hearing aid. In general, a wireless link established by antenna and transceiver circuitry of the hearing aid can be of any type. The wireless link may be established between two devices, e.g. between an entertainment device (e.g. a TV) and the hearing aid, or between two hearing aids, e.g. via a third, intermediate device (e.g. a processing device, such as a remote control device, a smartphone, etc.). The wireless link may be used under power constraints, e.g. in that the hearing aid may be constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation. The communication via the wireless link may be arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying), e.g. MSK (minimum shift keying), or QAM (quadrature amplitude modulation), etc.

The communication between the hearing aid and the other device may be in the base band (audio frequency range, e.g. between 0 and 20 kHz). Preferably, communication between the hearing aid and the other device is based on some sort of modulation at frequencies above 100 kHz. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology).

The hearing aid may have a maximum outer dimension of the order of 0.08 m (e.g. a headset). The hearing aid may have a maximum outer dimension of the order of 0.04 m (e.g. a hearing instrument).

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, e.g. less than 20 g.

The hearing aid may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing aid may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate. e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form pan of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L−)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user, or parts of the user. e.g. of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a rained neural network.

The hearing aid may further comprise other relevant functionality for the application in question, e.g. feedback control, compression, noise reduction, etc.

The hearing aid may comprise a hearing instrument, e.g. a hearing instrument adapted for being located at the car or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising audio distribution. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing device, e.g. a hearing aid or a headset, configured to be worn at or in an ear of a user is furthermore provided by the present application The method comprises a) convening a sound in an environment of the hearing device to at least one electric input signal representing said sound; b) estimating whether or not, or with what probability, said sound originates from the voice of the user, and providing an own voice control signal indicative thereof. The method may further comprise c) estimating whether or not, or with what probability, said user wears a face mask while speaking, and to providing a face mask control signal indicative thereof.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

A Computer Readable Medium or Data Carrier;

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

The APP may be configured exchange data with said hearing device and to allow the user to indicate a kind of face mask that the user might wear, said kind of face mask being selectable among a multitude of different types of face masks, and to communicate information related the selected face mask to the hearing device. The different types of face masks may be characterized in having different acoustic propagation properties of the user's own voice. The hearing device or the auxiliary device may contain a memory wherein such (typically frequency dependent) acoustic properties ('acoustic features') of the different types of face masks are stored.

Definitions:

In the present context, a hearing aid, e.g. a hearing instrument, refers to a device, which is adapted to improve, augment and/or protect the bearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or it may be an external unit in itself (possibly in combination with a flexible guiding element, e.g. a dome-like element).

More generally, a hearing aid comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing aids, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing aid and/or for storing information (e.g. processed information, e.g. provided by the signal processing circuit), e.g. for use in connection with an interface to a user and/or an interface to a programming device. In some hearing aids, the output unit may comprise an output transducer, such as e.g. a loudspeaker for providing an air-borne acoustic signal or a vibrator for providing a structure-borne or liquid-borne acoustic signal. In some hearing aids, the output unit may comprise one or more output electrodes for providing electric signals (e.g. to a multi-electrode array) for electrically stimulating the cochlear nerve (cochlear implant type hearing aid).

In some bearing aids, the vibrator may be adapted to provide a structure-borne acoustic signal transcutaneously or percutaneously to the skull bone. In some hearing aids, the vibrator may be implanted in the middle ear and/or in the inner ear. In some hearing aids, the vibrator may be adapted to provide a structure-borne acoustic signal to a middle-ear bone and/or to the cochlea. In some hearing aids, the vibrator may be adapted to provide a liquid-borne acoustic signal to the cochlear liquid, e.g. through the oval window. In some hearing aids, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as hearing aids or headsets, or similar wearable bearing devices.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc. whether referred to as software, firmware, middleware, microcode, hardware description language, or otherwise.

The present application relates to the field of hearing devices, e.g. hearing aids or headsets. The application deals with handling acoustic effects of a user's application of a mouthwear, e.g. a mouthpiece or a face mask (such as a surgical mask) on the detection and/or estimation of the user's own voice in a hearing device, such as a hearing aid or a headset. The present application deals in particular with detection of a user's own voice, and specifically with detection of the user's own voice while wearing a face mask or other face protection device or means. The present application is further focused on identifying and/or compensating acoustic changes due to such face mask or face protection.

Figure 1A:
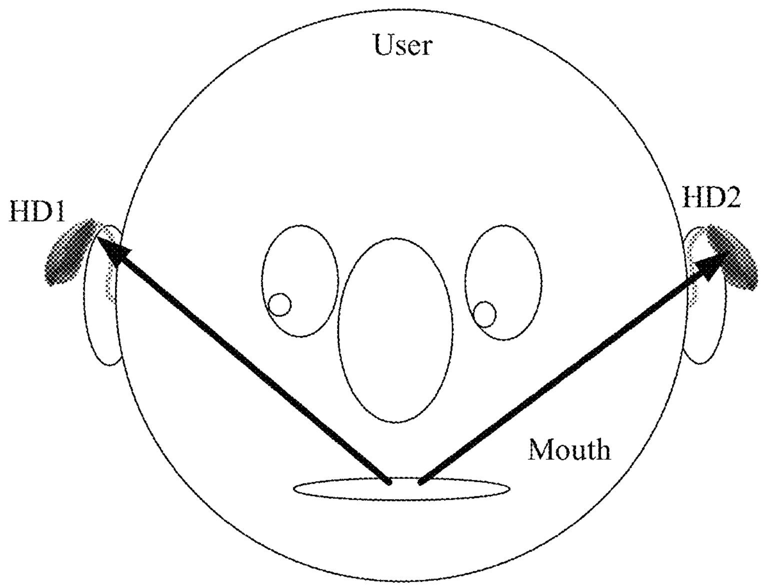
FIG. 1A shows a user speaking while wearing a binaural hearing aid system comprising first and second hearing devices.

When detecting or estimating a user's own voice, it is important to distinguish between when the hearing instrument user is talking with and without face mask (or other face or mouth covering device or item). FIG. 1A shows a user (User) speaking while wearing a binaural hearing aid system comprising first and second hearing devices (HD1, HD2). The fact that the user is speaking is indicated by solid arrows from the user's mouth (Mouth) to the right and left ears of the user (User), and thus to the first and second hearing devices (HD1, HD2), each comprising at least one input transducer for converting a sound in the environment of the hearing device to an electric input signal representing said sound, possibly including the user's own voice.

Figure 1B:
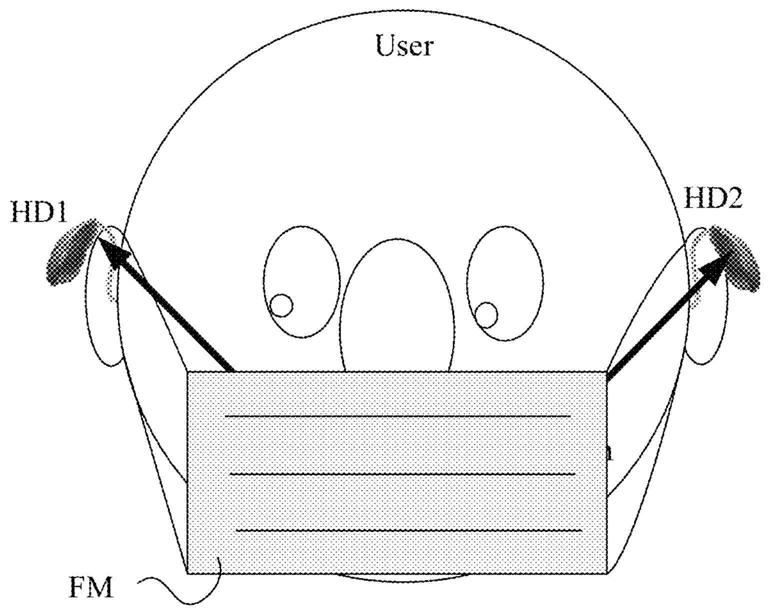
FIG. 1B shows the user of FIG. 1A, while simultaneously wearing a face mask.

FIG. 1B shows the user of FIG. 1A, while simultaneously wearing a face mask (FM), e.g. a surgical mask.

Figure 2A:
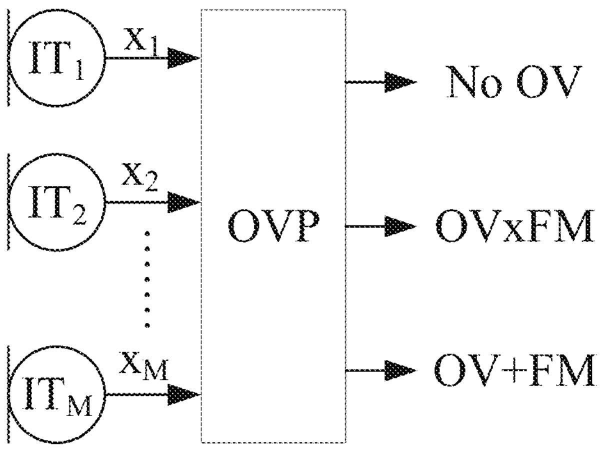
FIG. 2A shows a part of a hearing device comprising an own voice detector according to a first embodiment of the present disclosure.
Figure 2B:
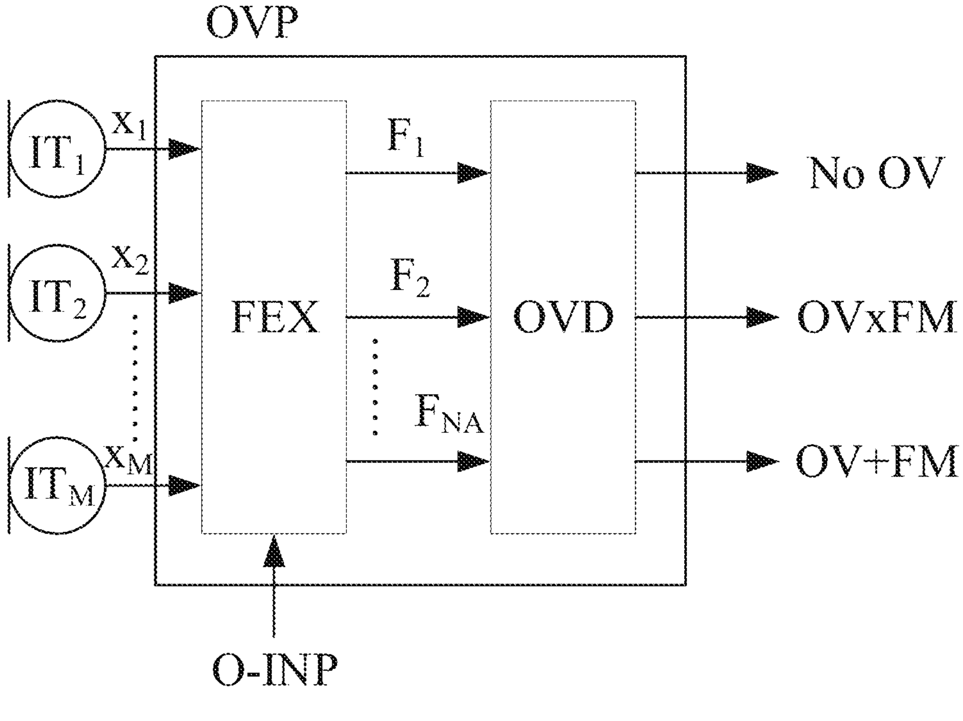
FIG. 2B shows a part of a hearing device comprising an own voice detector according to a second embodiment of the present disclosure.
Figure 2C:
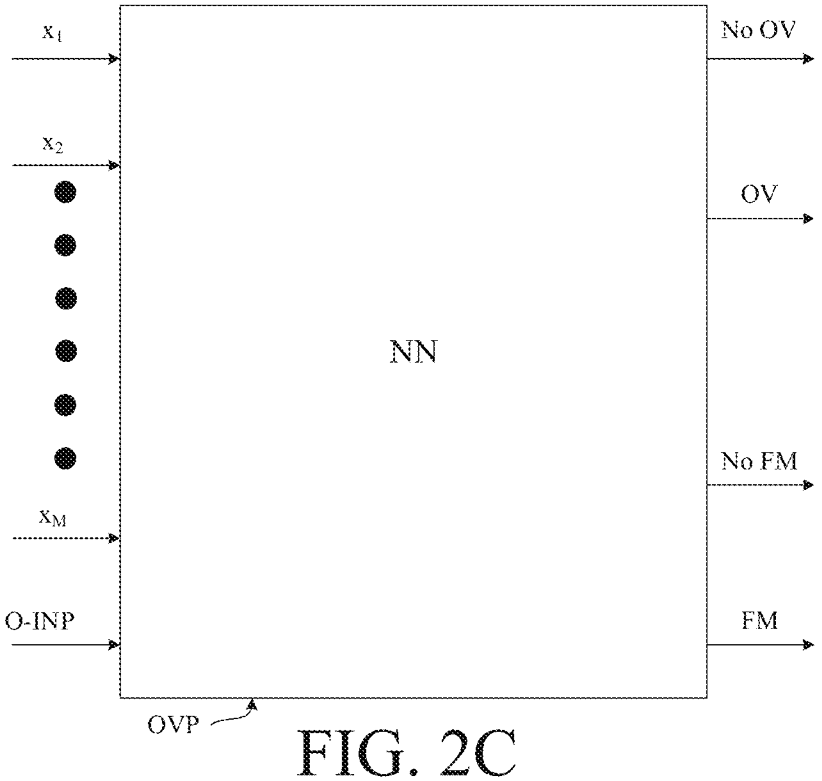
FIG. 2C shows an own voice processor according to the present disclosure implemented as a neural network.
Figure 2D:
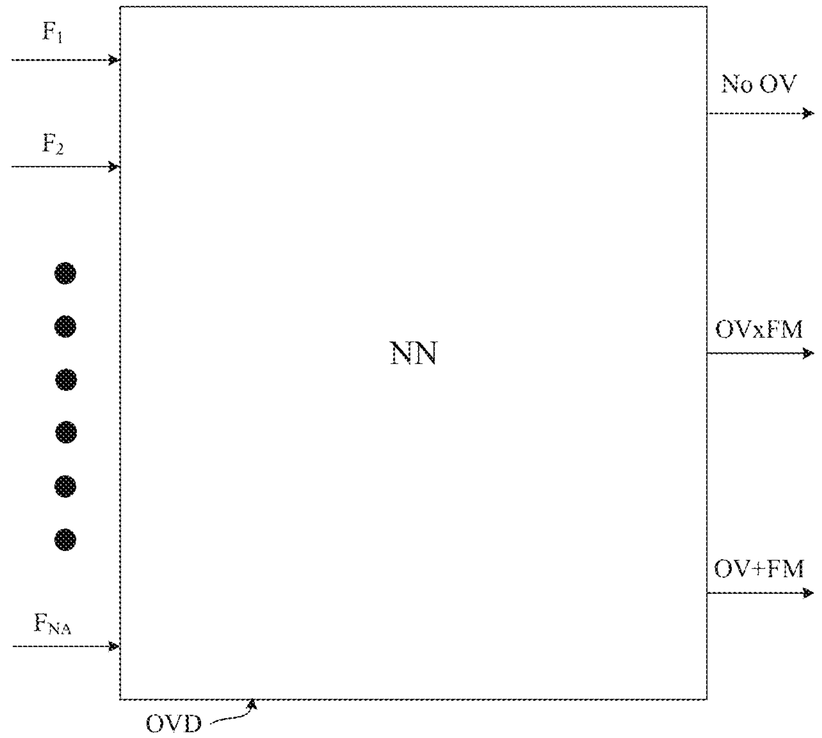
FIG. 2D shows an own voice detector according to the present disclosure implemented as a neural network, and FIG. 2E schematically illustrates different feature layers in an implementation of an own voice processor or own voice detector based on a neural network according to the present disclosure.

A proposed solution is sketched in FIG. 2A. 2B. The solutions of FIGS. 2A and 2B may fully or partially be implemented using a learning algorithm, e.g. a trained neural network, e.g. a deep neural network as indicated in FIG. 2C, 2D.

FIG. 2A shows a part of a hearing device, e.g. a hearing aid, comprising an own voice processor detector (OVP) according to an embodiment of the present disclosure. The hearing device comprises a multitude M of input transducers, $IT_m$, m=1, 2, . . . , M, here microphones. Other input transducers than microphones may be used e.g. vibration sensors, e.g. one or more accelerometers. Each microphone is configured to convert sound around the hearing device to an electric input signal $x_m$. The input transducer, $IT_m$, m=1.2, . . . , M, may comprise an analogue to digital converter for converting an analogue electric signal from a microphone to a digitized signal ($x_m$, m=1, 2, . . . , M) comprising a stream of digitized samples. The input transducer ($IT_m$) may comprise further circuitry for processing the input signal, such as e.g. an analysis filter bank to provide the electric input signal ($x_m$) in a time frequency representation $x_m(k,n)$ as the case may be (k, n being frequency and time-frame indices, respectively). The exemplary own voice processor (OVP) of FIG. 2A (and FIG. 2B) yields three output probabilities or binary values, denoted; No OV ('No own voice'). OV×FM ('own voice without face mask) and OV+FM ('own voice with face mask'). The confidence level of the output probabilities (or binary values) of a given hearing device may e.g. be further improved by comparison (e.g. combination) with a corresponding value from a contralateral device of a binaural hearing system (e.g. HD1, HD2 of FIG. 1A, 1B). The output probabilities (or binary values) may be further processed into decisions in other parts of the hearing device (e.g. in relation to estimating a user's own voice, e.g. in connection with a communication mode or to a voice control interface mode of operation of the hearing device, see e.g. FIG. 6, 7B). The transition between own voice and no own voice will in general change more frequently than the transition between mask and no mask. It is hence desirable that the OV/no OV decision can change/fluctuate more rapidly compared to the face mask/no face mask decision.

The own voice detection may be based on different features such as acoustic features ($F_1$, $F_2$, . . . . , $F_{NA}$). This is illustrated in the (part of an) embodiment of a hearing device of FIG. 2B, comprising the same elements as the embodiment of FIG. 2A. Additionally, the embodiment of FIG. 2B comprises a feature extractor (FEX) for extracting features of the electric input signals ($x_1$, $x_2$, . . . , $x_M$) and providing a number NA of acoustic features ($F_1$, $F_2$, . . . , $F_{NA}$). The acoustic features ($F_1$, $F_2$, . . . , $F_{NA}$) may e.g. be or comprise or relate to the microphone signals ($x_m$) captured by the hearing device or signals derived from the microphone signals, such as:

- Magnitude or power spectrum of the microphone signals, or of one or more signals derived therefrom,
- Phase difference between the microphone signals.
- Relative transfer functions between the microphones (e.g. both magnitude and phase),
- Beamformed signals (such as signals provided by own voice cancelling beamformers. e.g. derived with and without face mask), or from the beamformer derived control signals (as the adaptive coefficient beta in the generalized sidelobe canceller)

The acoustic features ($F_1$, $F_2$, . . . , $F_{NA}$) may further be influenced by one or more other input signals (O-INP), e.g. one or more signals from sensors or detectors, e.g. related to the acoustic environment, or to the user's present condition (movement/no movement, mental state, etc.).

The features ($F_1$, $F_2$, . . . , $F_{NA}$) extracted by the feature extractor (FEX) are fed to an own voice detector (OVD). The own voice detector provides the three output probabilities or binary values of the own voice processor (OVP): No OV ('No own voice'), OV×FM ('own voice without face mask') and OV+FM ('own voice with face mask').

Features derived from microphone signals in a binaural setup may as well be applied. In an embodiment at least one microphone is located in the ear canal. In addition to acoustic features, other features may as well be applied. E.g. vibrations picked up by an accelerometer located inside the hearing device or outside the hearing device, e.g. near the ear canal, may be used to distinguish between 'OV' or 'No OV' (not 'FM' or 'no FM'). The own voice processor (FIG. 2C) or the own voice detector (FIG. 2D) or the feature extractor may be fully or partly based on a neural network trained on the different classes (e.g. own voice with and without a (possibly specific) mask or different masks, in different signal to noise environments, etc.). The weights of the neural network may be selected based on the type of used face mask (scarf, surgical mask, face visor, material used for the face mask, acoustic attenuation of the face mask, etc.). A number $N_{FM}$ of different sets of optimized parameters for neural networks may thus be provided, each corresponding to a specific type of face mask or face protection product (cf, e.g. FIG. 5).

Figure 2E:
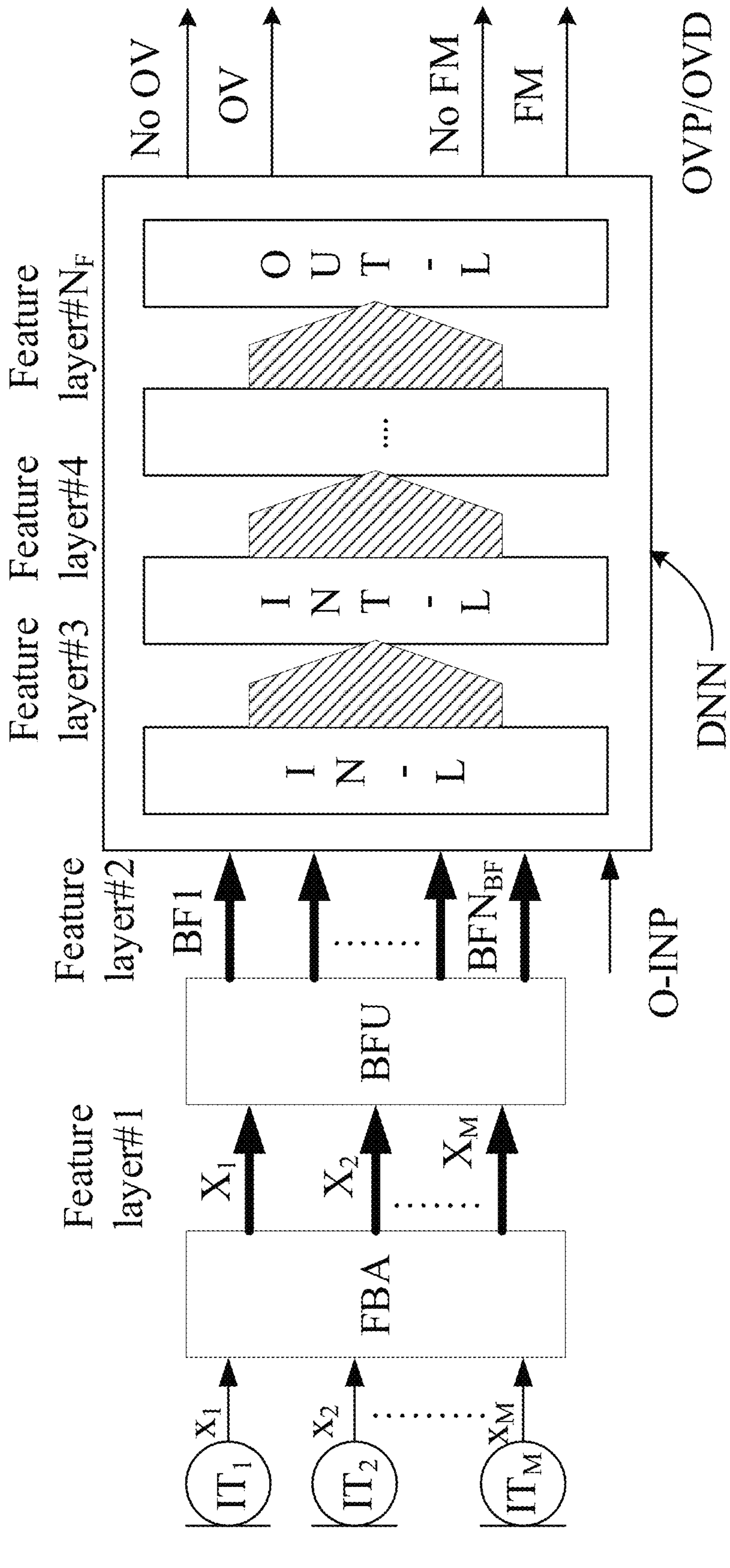

FIG. 2E schematically illustrates different feature layers ('Feature layer#q', q=1, 2, 3, 4, . . . , $N_F$, where $N_F$ is the number of feature layers) in an implementation of an own voice processor (OVP or own voice detector (OVD) based on a neural network (DNN) according to the present disclosure. The different feature layers may be provided by distinct functional blocks, e.g.:

- Analysis filter bank (FBA) providing the M electric (time domain) signals ($x_m$, m=1, . . . , M) in a time-frequency representation (as M frequency domain signals $X_m$, m=1, . . . , M).
- Beamformer filtering unit (BFU) provided a number of beamformed signals (or beamformers) BFp, p=1, . . . , $N_{BF}$ based on combinations of the electric input signals $X_m$.

The different feature layers may, however additionally or alternatively be provided by outputs of different layers of a neural network, e.g. a deep neural network (DNN) comprising an input layer ('IN-L' receiving beamformed signals (or beamformers) BFp as inputs and providing features of 'Feature layer#3' as output), a number of intermediate (hidden) layers ('INT-L', ', . . . ' providing 'Feature layer#4', . . . , 'Feature layer#NF'), and an output layer ('OUT-L' providing functional outputs, here 'No OV, 'OV, 'No FM', 'FM', see e.g. also FIGS. 2A-2D and FIG. 4). The neural network (DNN) may e.g. include the beamformer filtering unit (BFU). The beamformer filtering unit (BFU) may thus form part of or constitute the feature extraction unit (FEX) in FIG. 2B or 4. But the feature extraction unit may also be considered as forming part of a neural network implementation of the functional feature (her an own voice processor or own voice detector or face mask detector according to the present disclosure).

Figure 3:
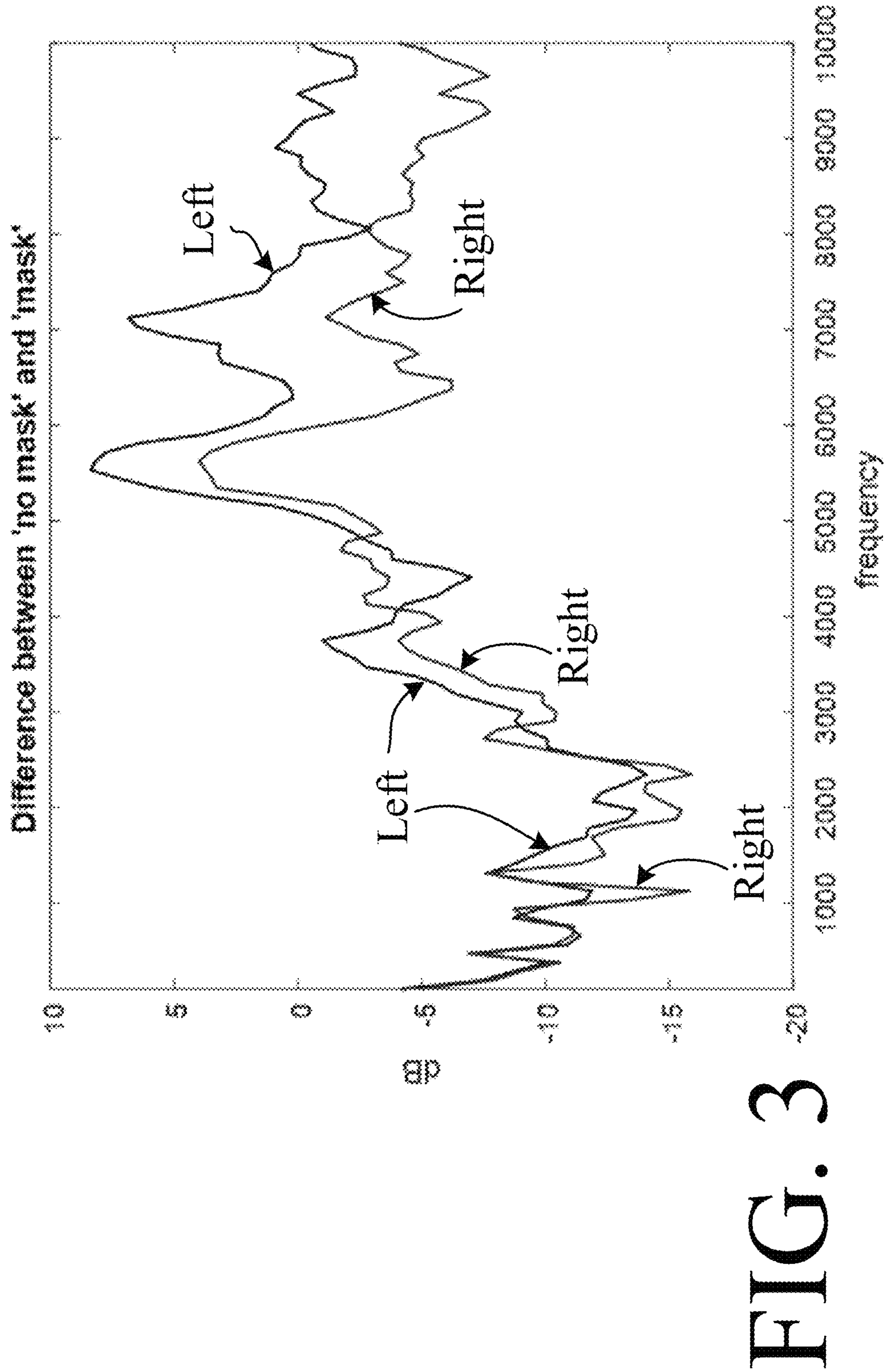
FIG. 3 shows a measurement of the difference between sound pressure level recorded without and with a face mask.

FIG. 3 shows a measurement of the difference between sound pressure level recorded without and with a face mask. The two curves show the difference in level recorded at a microphone located at a hearing device mounted at the left and the right ear, respectively. Both graphs show the difference between no face mask and face mask (at 'Left' and 'Right' sides, respectively). At low frequencies (below a threshold frequency $f_{th}$, e.g. below 4 or 5 kHz), the sound seems to be reflected from the face mask resulting in a relatively higher level (received at the ears while using face mask) at low frequencies ($\leq f_{th}$) compared to the higher frequencies ($>f_{th}$). The difference between the left and right ears at higher frequencies illustrated by FIG. 3 may e.g. be due to or at least influenced by minor facial face mask mounting asymmetries. This change of spectral tilt may be used as a feature to distinguish between whether the person is wearing a face mask. The hearing aid may comprise a memory wherein reference data for own voice reception at the microphones of the hearing aid are stored (cf, e.g. FIG. 5), e.g. focused on frequencies below the threshold frequency $f_{th}$. Such data may e.g. include data as shown in FIG. 3, or equivalent, recorded while the user (or other person, or model) speaks with and without a face mask (or similar, e.g. visor).

At frequencies above the threshold frequency $f_th$, the user's own voice is attenuated. The effect of the face mask on the user's voice (e.g. as received at the ears of the user) may hence be equal to that of a low-pass filter. At frequencies above a 3 dB cut-off frequency of the low-pass filter, e.g. the threshold frequency fun, the user's own voice is attenuated.

Due to the frequency tilt of the user's own voice, when wearing a face mask, it may be easier to detect own voice, if the user wears a face mask.

It may be advantageous to focus on frequencies below the threshold frequency $f_{th}$, when detecting own voice.

The user's own voice may be detected using a (trained) neural network.

FIG. 3 is focused on differences in magnitude (level). Differences in phase may also be used to detect the wearing or non-wearing of a face mask.

Figure 4:
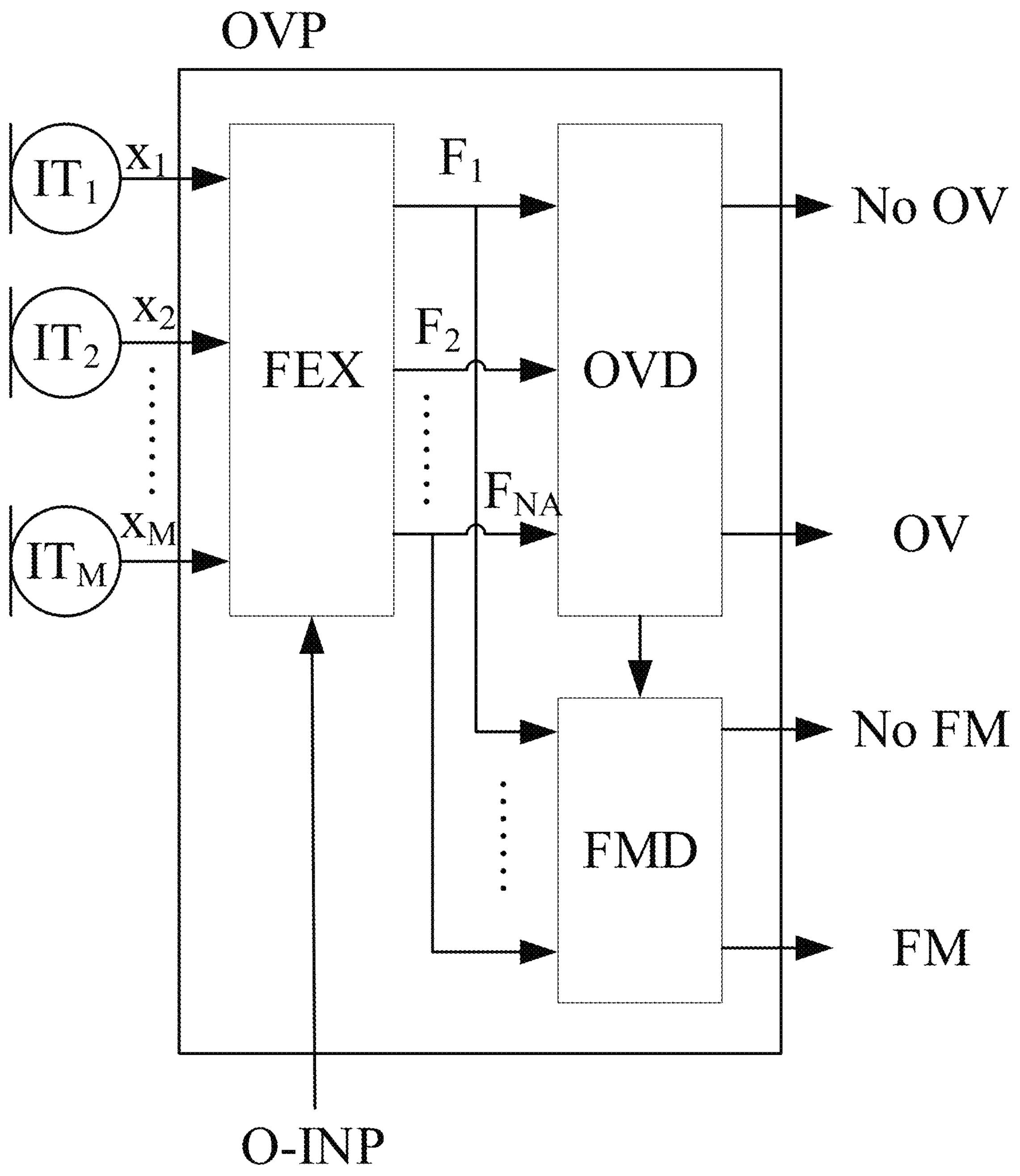
FIG. 4 shows a part of a hearing aid comprising an own voice detector and a face mask detector according to an embodiment of the present disclosure.

FIG. 4 shows. The own voice processor (OVP) of the hearing aid comprises an own voice detector (OVD) as well as a face mask detector (FMD). FIG. 4 shows an implementation wherein the own voice detector (OVD) and the face mask detector (FMD) are implemented as two different detectors. This may be advantageous as the OVD and the FMD may have different input features. The two detectors may have same, different, or partly overlapping input features. For example, the own voice detector may depend on both acoustic features and vibration-related features, where the face mask detector mainly relies on differences in acoustic features. In the example of FIG. 4, feature F2 may represent a vibration-related feature, which is only fed to the own voice detector (but not to the face mask detector). In an embodiment the face mask detector (FMD) is only updated when own voice is detected (cf. input OV from the OVD). Both the FMD and the OVD may be implemented by use of a trained neural network (cf, e.g. FIG. 2C, 2D).

Depending on the detection of a face mask, different actions can be taken. As the acoustic properties change when the user is wearing a face mask (as illustrated in FIG. 3), the frequency shape of the user's own voice may be modified in order to provide a more natural own voice-both for the user and for hands-free telephony.

An own voice enhancing beamformer may as well take advantage of a face mask detector, as the transfer function between the different microphones may change depending on the face mask. The beamformer may be implemented as an MVDR beamformer relying either on a relative own voice transfer function with or without a face mask. The relative own voice transfer functions may as well be estimated during use—either when the user is talking without face mask or when the user is talking while wearing a face mask.

In a keyword spotting system where a keyword or a wake word is detected while the user is talking, the presence or absence of a face mask may as well be taking into account e.g. by compensating for the spectral shape of the input signal to a keyword detector such that the spectral properties are similar both for an own voice signal both in presence and in absence of a face mask. Alternatively, training the detector using signals both with and without the person wearing a face mask.

A face mask detector may as well be used to trigger a reminder. E.g. if the user is not wearing a face mask at places, where is advantageous or required to wear a face mask, the user could be reminded, e.g. via audio feedback played through the hearing device or via a smart phone, smart watch or similar. The reminder could be enabled based on the user's location, e.g. outside the user's home, in public transportation or in shopping areas.

Wearing a face mask may be an indication that other people as well are wearing a face mask. It may thus be advantageous to adjust the settings of the hearing instruments such that more help is provided in difficult situations (in terms of increased noise reduction or improved speech clarity) as other people wearing a face mask may result in increased mumbling as well as the lack of lip-reading cues.

Figure 5:
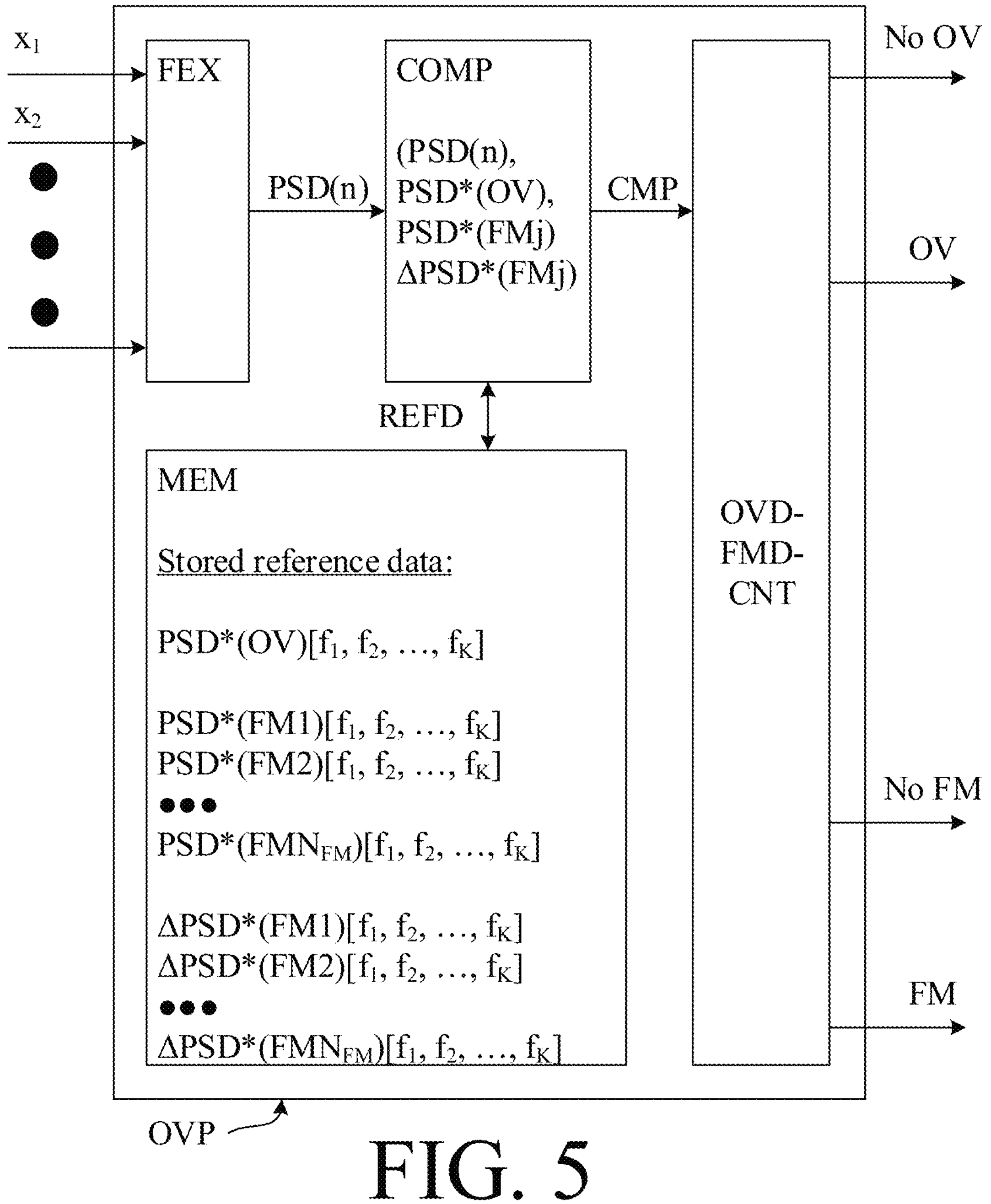
FIG. 5 shows an embodiment of an own voice processor according to the present disclosure.

FIG. 5 shows an embodiment of an own voice processor (OVP according to the present disclosure. The own voice processor (OVP) comprises a feature extractor (FEX) for extracting features of the electric input signals ($x_1$, $x_2$, . . . , $x_M$) and providing a number NA of acoustic features ($F_1$, $F_2$, . . . , $F_{NA}$) as described in connection with FIG. 2B. In the example of FIG. 5, the acoustic property focused on is power spectral density (PSD). Values of current power spectral density (denoted PSD(n), where n is a time index) are provided by the feature extractor (FEX). PSD(n) may represent the current power spectral density of a single one of the electric input signals, or of some or all of the electric input signals ($x_1$, $x_2$, . . . , $x_M$), or of a dedicated own voice signal estimate (e.g. the output of an own voice beamformer, cf, e.g. user own voice signal 'UOV' in FIG. 8). The own voice processor (OVP) further comprises a memory (MEM) wherein reference data for own voice reception at the input transducers (e.g. microphones) of the hearing device (e.g. hearing aid) are stored (cf. data PSD* in block MEM of FIG. 5). The reference data (PSD*) may e.g. include data as shown in FIG. 3, or equivalent, recorded while the user (or other person, or model) speaks with (PSD*(FMj)) and without (PSD*(OV)) a face mask. The reference data (PSD*) are typically frequency dependent representing acoustic properties ('acoustic features') related to the user's own voice. The frequency dependency is indicated by parameters [$f_1$, $f_2$, . . . , $f_K$], where f is a frequency (index) and K is the number of frequencies (e.g. frequency bands) considered. Data PSD*(FMj), j=1, 2, . . . , $N_{FM}$), where $N_{FM}$ is the number of different kinds of face masks considered, represent reference values for $N_{FM}$ different face masks (e.g. standardized masks or otherwise characterized face masks, optionally 'home made' (or other uncharacterized) face masks for which own voice data are available) recorded while the user (or a model of the user) wears the face mask in question while speaking. The reference data (PSD*) may e.g. further or alternatively include difference data ΔPSD*(FMj), j=1.2, . . . , $N_{FM}$) representing the acoustic distortion of the different types of face masks, in other words ΔPSD*(FMj)=PSD*(OV)−PSD*(FMj) [dB], j=1, 2, . . . , $N_{FM}$, when using a logarithmic representation of the values.

The own voice processor (OVP) further comprises a comparator (COMP) for comparing the current value of the acoustic property (PSD(n)) with the stored reference values (PSD*(OV), PSD*(FMj), ΔPSD*(FMj)) and based thereon to provide a degree of similarity of the comparison (cf. signal CMP) to a controller (OVD-FMD-CNT) for providing the own voice control signal(s) No OV, OV and face mask control signals (No FM, FM) as described in connection with FIG. 2A, 2B, 2C, 2D, 4.

Other acoustic features than the power spectral density used in the example of FIG. 5 may be used in the same principle way.

Figure 6:
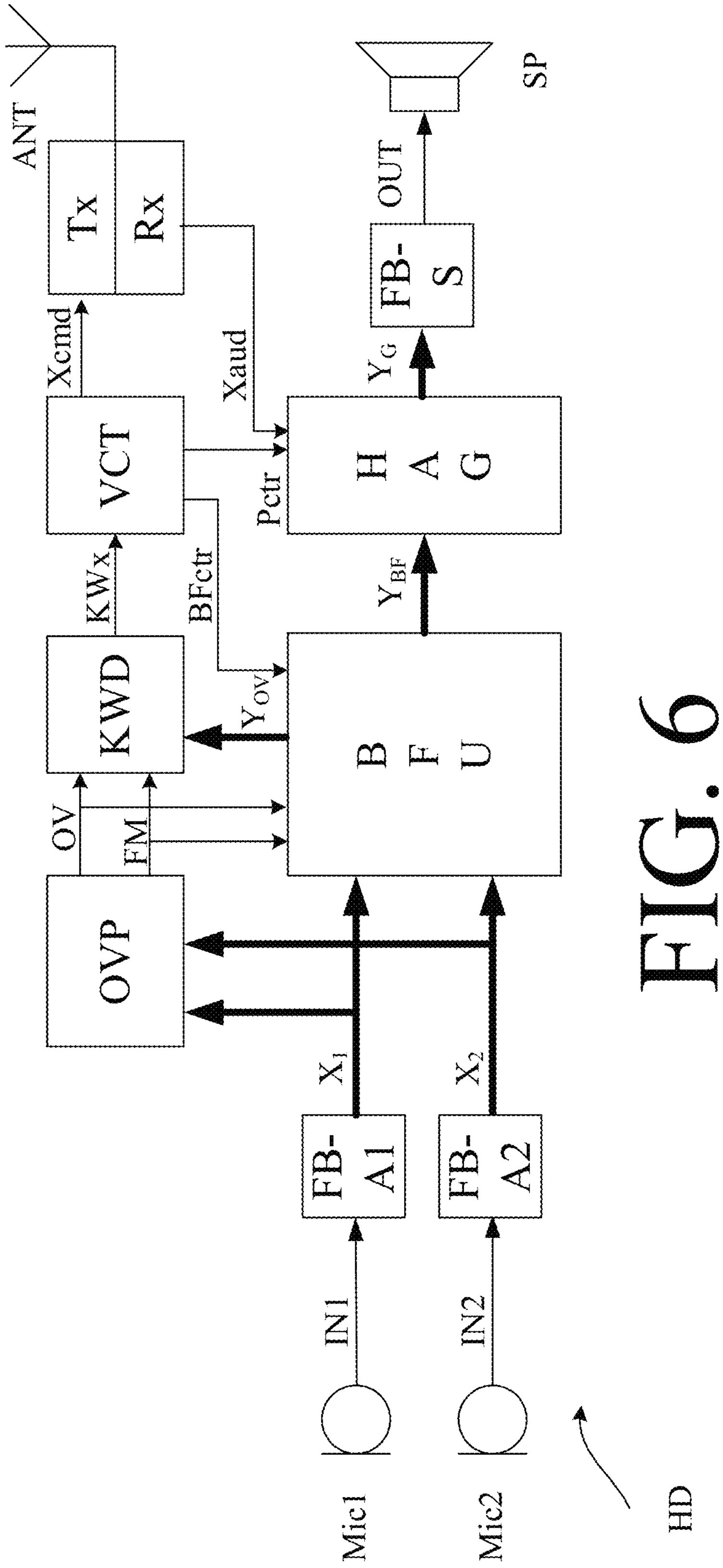
FIG. 6 shows a hearing device according to an embodiment of the present disclosure comprising an own voice processor comprising an own voice detector and a face mask detector.

FIG. 6 shows a hearing device according to an embodiment of the present disclosure comprising an own voice processor comprising an own voice detector and a face mask detector. FIG. 6 shows an embodiment of a hearing device (HD) comprising an own voice processor (OVP) (comprising an own voice detector (OVD) in combination with a face mask detector (FMD)) and a voice control interface (VCT) according to the present disclosure. The hearing device (HD) of FIG. 6, e.g. a hearing aid or a headset, comprises first and second microphones (Mic1, Mic2) providing respective first and second electric (e.g. digitized) input signals (IN1, IN2) representative of sound in the environment of the hearing device. The hearing device is configured to be worn at or in an ear of a user. The hearing device comprises a forward path comprising the two microphones, first and second analysis filter banks (FB-A1, FB-A2) for converting the first and second (possibly feedback corrected) time domain input signals (IN1, IN2) to first and second frequency sub-band signals (X1, X2), respectively. The frequency sub-band signals of the forward path are indicated by bold line arrows in FIG. 5. The forward path further comprises a beamformer filtering unit (BFU) for providing a spatially filtered signal $Y_{BF}$ in dependence of the first and second input signals (X1, X2). The beamformer filtering unit (BFU) may e.g. be configured to substantially leave signals from a target direction unattenuated while attenuating signals from other directions, e.g. adaptively attenuating noise sources around the user wearing the hearing device. The forward path further comprises a processor (HAG) for applying one or more processing algorithms to the beamformed signal $Y_{BF}$, (or a signal derived therefrom), e.g. a compressive amplification algorithm for applying a frequency and level dependent compression (or amplification) to a signal of the forward path according to a user's needs (e.g. a hearing impairment). The processor (HAG) provides a processed signal ($Y_G$) to a synthesis filter bank (FB-S) for converting a frequency sub-band signal ($Y_G$) to a time domain output signal (OUT). The forward path further comprises a loudspeaker (SP) for converting the electric output signal (OUT) to an output sound intended for being propagated to the user's ear drum. The first and second feedback corrected frequency sub-band signals ($X_1$, $X_2$) are (in addition to the beamformer filtering unit (BFU)) fed to the own voice detector (OVD) provides an own voice control signal (OV) indicative of whether or not or with what probability the electric input signals comprise speech of the user at a given point in time. The own voice detector (OVD) may e.g. operate on one or more of the first and second (possibly feedback corrected) electric input signals ($X_1$, $X_2$) and/or on a spatially filtered signal (e.g. from an own voice beamformer, $Y_{OV}$). The own voice detector (OVD) may be configured to influence its indication (of OV or not, or p(OV)) by a signal from one or more sensors or detectors. Likewise, the face mask detector (FMD) provides a face mask control signal (FM) indicative of whether or not or with what probability the user wears a face mask at a given point in time. The own voice and face mask control signals (OV, FM) are fed to a keyword detector (KWD) for detecting whether specific words or commands are spoken by the user at a given point in time.

The keyword detector (KWD is e.g. configured to determine whether or not (or with what probability p(KWx)) the current electric input signals ($X_1$, $X_2$) or a signal from an own voice beamformer $Y_{OV}$ comprise a particular one (KWx) of a number Q (e.g. ≤20) of predefined keywords or key phrases. In an embodiment, a decision regarding whether or not or with what probability the current electric input signals comprises a particular keyword (or key phrase) AND is spoken by the user of the hearing device is determined as a combination of simultaneous outputs of a KWD-algorithm (e.g. a neural network) and an own voice detector (OVD, e.g. as an AND operation of binary outputs or as a product of probabilities of a probabilistic output).

The result (e.g. a key word KWx) of the keyword detector (KWD) at a given point in time is fed to a voice control interface (VCT) configured to convert a given detected keyword (or key phrase) to a command (BFctr, Pctr, Xcmd) for controlling a function of the hearing device (HD), e.g. the beamformer filtering unit (BFU, cf. command BFctr), the processor (HAG, cf. command Pctr) and/or of another device or system (cf. command Xcmd forwarded to transceiver Tx/Rx for being transmitted to another device or system). One of the keywords (BFctr) may relate to controlling the beamformer filtering unit (BFU) of the hearing device (HD), e.g. an omni- or DIR mode (e.g. 'DIR-back', or 'DIR-right', to give a currently preferred direction of the beamformer, other than a default direction, e.g. a look direction), cf. signal BFctr. The same or another one of the keywords may relate to controlling the gain of the processor (HAG) of the hearing device (HD), e.g. 'VOLUME-down' or 'VOLUME-up' to control a current volume of the hearing device), cf. signal Getr. The same or another one of the keywords may relate to controlling an external device or system, cf. signal Xcmd. Other functions of the hearing device may be influenced via the voice control interface (and/or via the detectors, e.g. the own voice detector), e.g. the feedback control system, e.g. whether an update of filter coefficients should be activated or disabled, and/or whether the adaptation rate of the adaptive algorithm should be changed (e.g. increased or decreased)). A command (Xcmd) may be transmitted to another device or system via appropriate transmitter (Tx) and antenna (ANT) circuitry in the hearing device. Further, in a telephone (or headset) mode, wherein a user's own voice is picked up by a dedicated own-voice beamformer and transmitted to a telephone, and an audio signal (Xaud) is received by appropriate antenna and receiver circuitry (ANT, Rx) from the telephone and presented to the user via an output unit (e.g. a loudspeaker, here SP) of the hearing device (cf, e.g. FIG. 8), may be entered (or left) using a command spoken by the user (e.g. 'TELEPHONE' to take (or close) a telephone call). Preferably, the keyword detector of the hearing device is capable of identifying a limited number of keywords to provide voice control of essential features of the hearing device, e.g. program shift, volume control, mode control, etc., based on local processing power (without relying on access to a server or another device in communication with the hearing device). In an embodiment, activation of a 'personal assistant' (such as 'Siri' of Apple devices or 'Genie' of Android based devices or 'Google Now' or 'OK Google' for Google applications or 'Alexa' for Amazon applications) on another device, e.g. a smartphone or similar (e.g. via an API of the other device), may be enabled via the voice control interface of the hearing device. The keyword detector of the hearing device may be configured to detect the wake-word (e.g. 'Genie') as one of the keywords, and when it is detected to transmit it (or another command, or the following words or sentences spoken by the user, or a communication partner) to the smartphone (e.g. to an APP, e.g. an APP for controlling the hearing device), from which the personal assistant or a translation service (e.g. initiated by another subsequent keyword, e.g. 'TRANSLATE') may thereby be activated. In all cases a valid detection of the user's own voice is of importance. Hence a compensation for any distortion of the user's own voice that might lower the confidence of the own voice control detector from the own voice detector a user's voice is of interest. Such compensation may be provided by the own voice processor (OVP) according to the present disclosure, e.g. by the face mask control signal (FM) indicative of whether or not the user wears a face mask.

In case a face mask (FM) is detected, a compensation for the change of the input spectrum due to the own voice modified by a face mask may be provided by the hearing device. By compensating for the spectral change due to a face mask, the input feature to the keyword detector (KWD) may be more similar to the own voice without face mask.

Alternatively, the keyword detector (KWD) may be trained on data recorded with and without a face mask.

Figure 7A:
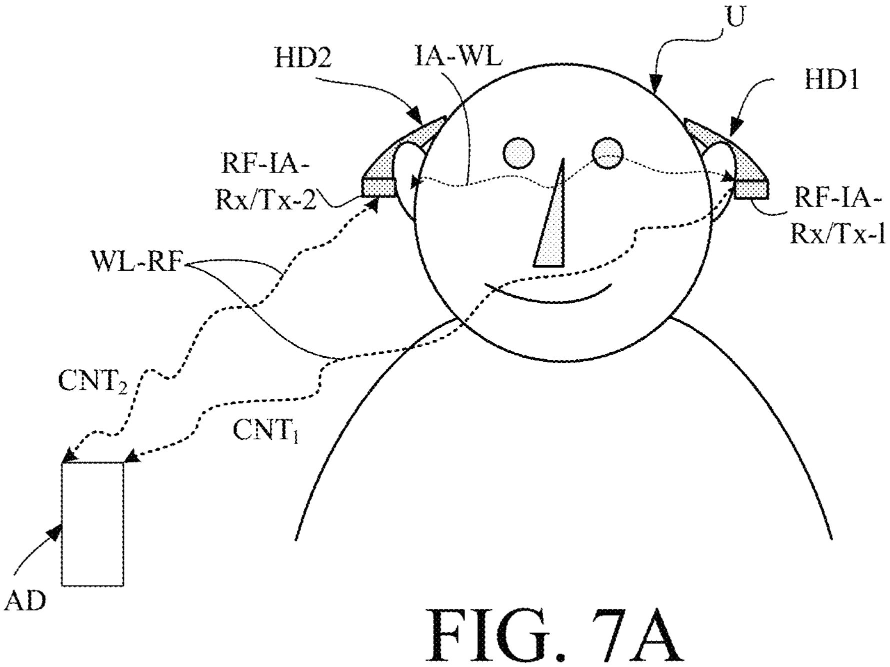
FIG. 7A shows a hearing system comprising a hearing aid and an auxiliary device in communication with each other.
Figure 7B:
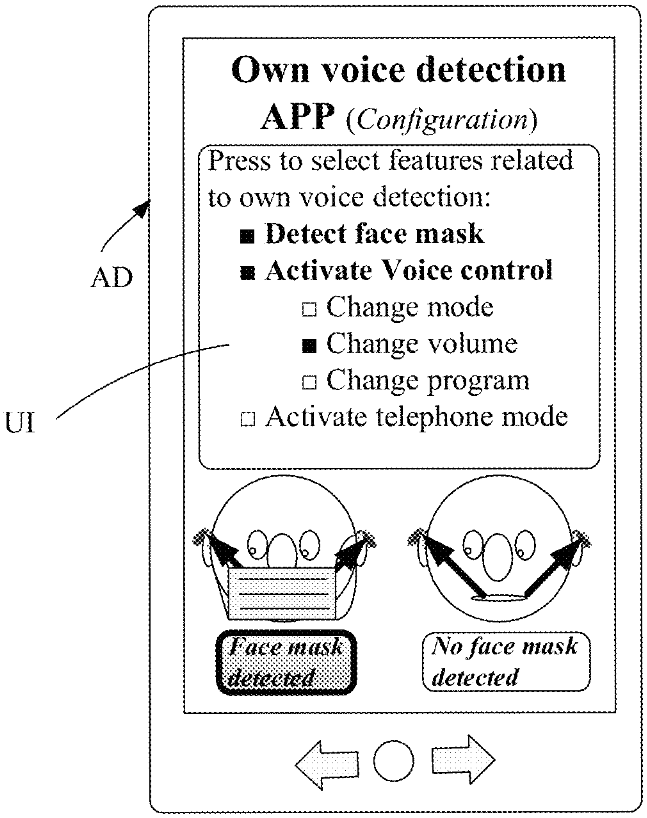
FIG. 7B shows the auxiliary device of FIG. 7A configured to implement a user interface for the hearing aid by running an application program from which a mode of operation of the hearing aid can be selected.

FIGS. 7A and 7B together illustrate an exemplary application scenario of an embodiment of a hearing system (HD1, HD2, AD) according to the present disclosure.

FIG. 7A shows a hearing system comprising a hearing device (HD1, HD2), e.g. a hearing aid, and an auxiliary device (AD) in communication with each other. FIG. 7A shows an embodiment of a head-worn binaural hearing system comprising left and right hearing devices (HD1, HD2) in communication with each other and with a portable (handheld) auxiliary device (AD) functioning as a user interface (UI) for the binaural hearing aid system (see FIG. 7B). The binaural hearing system may comprise the auxiliary device AD (and the user interface UI). The binaural hearing system may comprise the left and right hearing devices (HD1, HD2) and be connectable to (but not include) the auxiliary device (AD). In the embodiment of FIG. 7A, the hearing devices (HD1, HD2) and the auxiliary device (AD) are configured to establish wireless links (WL-RF) between them, e.g. in the form of digital transmission links according to the Bluetooth standard (e.g. Bluetooth Low Energy, or equivalent technology). The links may alternatively be implemented in any other convenient wireless and/or wired manner, and according to any appropriate modulation type or transmission standard, possibly different for different audio sources.

The hearing devices (HD1. HD2) are shown in FIG. 7A as devices mounted at the ear (behind the ear) of a user (U). Other styles may be used, e.g. located completely in the ear (e.g. in the ear canal), fully or partly implanted in the head, etc. As indicated in FIG. 7A, each of the hearing devices may comprise a wireless transceiver to establish an interaural wireless link (IA-WL) between the hearing devices, e.g. based on inductive communication or RF communication (e.g. Bluetooth technology). Each of the hearing devices further comprises a transceiver for establishing a wireless link (WL-RF, e.g. based on radiated fields (RF)) to the auxiliary device (AD), at least for receiving and/or transmitting signals, e.g. control signals, e.g. information signals, e.g. including audio signals. The transceivers are indicated by RF-IA-Rx/Tx-1 and RF-IA-Rx/Tx-2 in the right (HD2) and left (HD1) hearing devices, respectively. The remote control-APP may be configured to interact with a single hearing device (instead of with a binaural hearing system, as illustrated in FIG. 7A).

The auxiliary device (AD) is adapted to run an application program, termed an APP, comprising executable instructions configured to be executed on the auxiliary device (e.g. a smartphone) to implement a user interface for the hearing device (or hearing system). The APP is configured to exchange data with the hearing device(s). FIG. 7B shows the auxiliary device (AD) of FIG. 7A configured to implement a user interface for the hearing device(s) (HD1, HD2) by running an application program from which a mode of operation of the hearing aid can be selected and via which selectable options for the user, and/or current status information can be displayed.

FIG. 7B illustrates the auxiliary device running an APP for configuring own voice detection features. An exemplary (configuration) screen of the user interface UI of the auxiliary device AD is shown in FIG. 7B. The user interface (UI) comprises a display (e.g. a touch sensitive display) displaying guidance to the user to configure features of the hearing system related to own voice detection. The user interface (UI) is implemented as an APP on the auxiliary device (AD, e.g. a smartphone). The APP is denoted 'Own voice detection APP'. Via the display of the user interface, the user (U) is instructed to select one or more of 'Detect face mask'. 'Activate Voice control', and 'Activate telephone mode'. The Voice control interface may be configured via activation of one or more selectable features 'Change mode'. 'Change volume', 'Change program'. Other features (e.g. 'Activate wake-word detection for PDA' to allow detection of a wake-word in the hearing device(s) for a personal digital assistant of the auxiliary device, e.g. a smartphone, e.g. 'Hey Siri, of an Apple smartphone, or the like) may be added or selectable instead. The activation of a given feature is selected by pressing the 'button' in question, which when selected is indicated in bold face and a filled square (■) in front of the activated feature(s). In the exemplary 'Configuration' screen of the 'Own voice detection APP', the features 'Detect face mask' and 'Activated Voice control'(specifically 'Change volume') are selected (activated). In the lower part of the screen information to the user of the current status of the bearing device(s) regarding the selected features can be displayed, here a symbol and corresponding text 'face mask detected' are provided, thereby the user is informed that the system has detected that the user wears a face mask. In this field of the screen of the user interface, information to the user that he or she should contemplate wearing a face mask in the current environment can be displayed (e.g. in addition to or as an alternative to an acoustic reminder via the output transducer(s) of the hearing device(s)). The current environment may be detected by the hearing device(s) and/or by the auxiliary device (e.g. using acoustic features extracted from the electric input signals of the hearing device(s), and/or GPS functionality of the auxiliary device).

Further screens (e.g. a 'Select type of face mask' screen) of the APP may allow the user to indicate a kind of face mask that the user might wear. The kind of face mask is selectable among a multitude of different types of face masks. The different types of face masks may be characterized in having different acoustic propagation properties of the user's own voice. The hearing device or the auxiliary device may contain a memory wherein such (typically frequency dependent) acoustic properties ('acoustic features') of the different types of face masks are stored (cf, e.g. FIG. 5). The APP may be configured to communicate information related the selected face mask (e.g. its kind, e.g. EN14683, N95. KN95, etc., and/or its acoustic properties) to the hearing device(s).

Switching between different screens of the APP may be achieved via left and right arrows in the bottom of the auxiliary device, or via 'soft buttons' integrated in the display of the user interface (UI).

Figure 8:
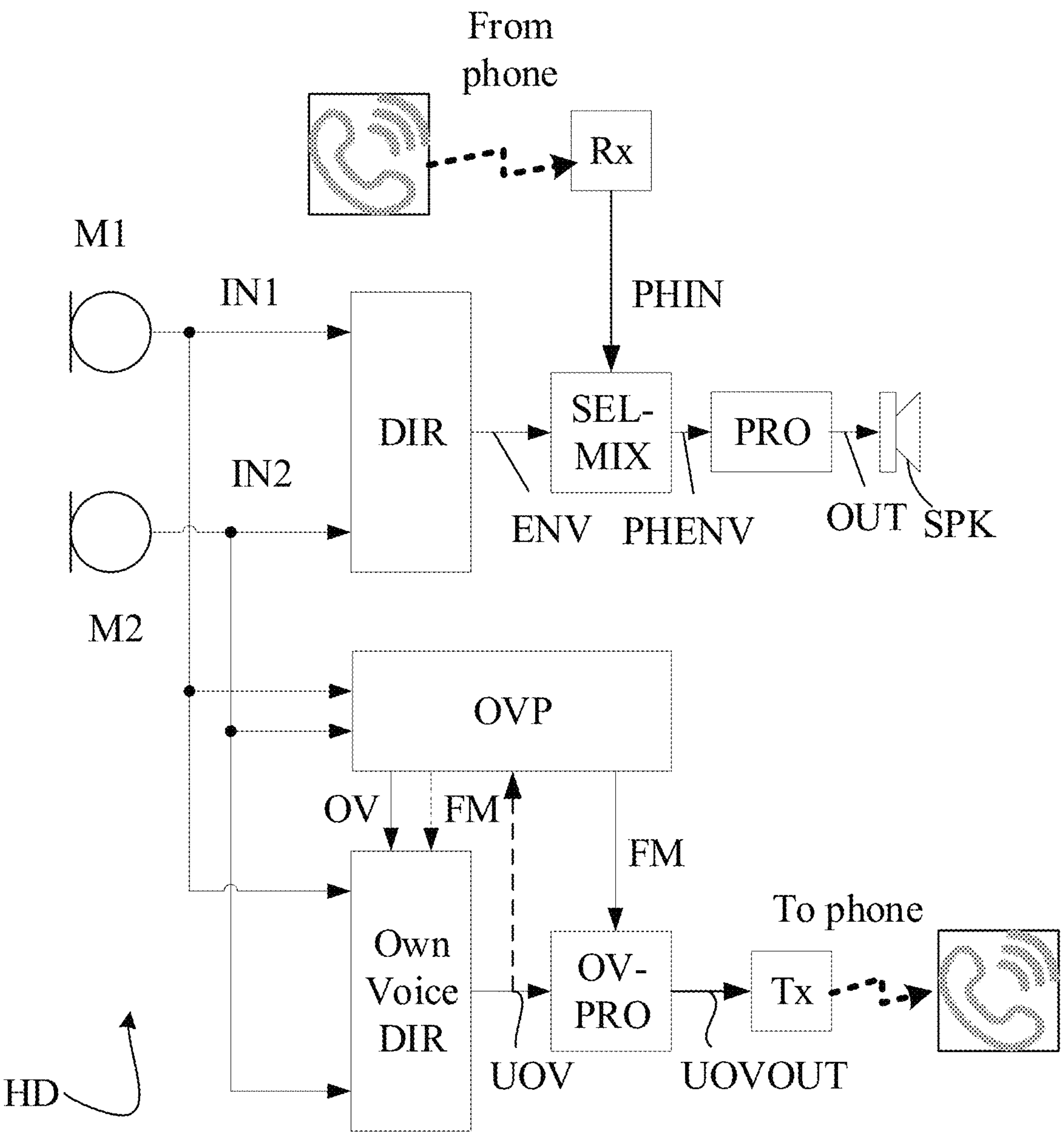
FIG. 8 shows an embodiment of a headset or a hearing aid comprising own voice estimation and the option of transmitting the own voice estimate to another device, and to receive sound from another device for presentation to the user via a loudspeaker, e.g. mixed with sound from the environment of the user according to the present disclosure.

In the embodiment of FIG. 7A, /B, the auxiliary device (AD) is described as a smartphone. The auxiliary device may, however, be embodied in other portable electronic devices, e.g. an FM-transmitter, a dedicated remote control-device, a smartwatch, a tablet computer, etc. FIG. 8 shows an embodiment of a headset or a hearing aid comprising own voice estimation and the option of transmitting the own voice estimate to another device, and to receive sound from another device for presentation to the user via a loudspeaker, e.g. mixed with sound from the environment of the user according to the present disclosure. The hearing device (HD) comprises two microphones (M1, M2) to provide electric input signals IN1, IN2 representing sound in the environment of a user wearing the hearing device. The hearing device further comprises spatial filters DIR and Own Voice DIR, each providing a spatially filtered signal (ENV and OV respectively) based on the electric input signals (IN1, IN2). The spatial filter DIR may e.g. implement a target maintaining, noise cancelling, beamformer. The spatial filter Own Voice DIR implements spatial filter configured to pick up the user's own voice. The spatial filter Own Voice DIR implements an own voice beamformer directed at the mouth of the user. The activation and control of the Own Voice DIR is controlled by an own voice processor (OVP) according to the present disclosure. The own voice processor provides control signals (OV, FM) indicative of the presence of the user's own voice (OV) and of whether the user wears a face mask (FM), respectively. In a specific telephone mode of operation, the user's own voice is picked up by the microphones M1, M2 and spatially filtered by the own voice beamformer of spatial filter 'Own Voice DIR' providing an estimate of the user's own voice (signal UOV). The signal UOV may be used by the own voice processor as inputs to determine the own voice and/or face mask control signals (OV, FM) as indicated by dashed arrow from the 'own Voice DIR-' to the 'OVP'-block. The bearing device further comprise an own voice signal processor (OV-PRO) configured to improve the estimate of the user's own voice and provide a modified own voice signal (UOVOUT) in dependence of the face mask control signal (FM). The own voice signal processor may be configured to modify the frequency shape of the user's own voice in dependence of the face mask control signal (FM). Thereby the frequency shaping of the user's own voice performed by the face mask can be compensated for. The modified (improved) own voice signal (UOVOUT) is fed to transmitter Tx and transmitted (by cable or wireless link to another device or system (e.g. a telephone, cf dashed arrow denoted 'To phone' and telephone symbol). In the specific telephone mode of operation, signal PHIN may be received by (wired or wireless) receiver Rx from another device or system (e.g. a telephone, as indicated by telephone symbol and dashed arrow denoted 'From Phone'). When a far-end talker is active, signal PHIN contains speech from the far-end talker, e.g. transmitted via a telephone line (e.g. fully or partially wirelessly, but typically at least partially cable-borne). The 'far-end' telephone signal PHIN may be selected or mixed with the environment signal ENV from the spatial filter DIR in a combination unit (here selector/mixer SEL-MIX), and the selected or mixed signal PHENV is fed to output transducer SPK (e.g. a loudspeaker or a vibrator of a bone conduction hearing device) for presentation to the user as sound. Optionally, as shown in FIG. 8, the selected or mixed signal PHENV may be fed to processor PRO for applying one or more processing algorithms to the selected or mixed signal PHENV to provide processed signal OUT, which is then fed to the output transducer SPK. The embodiment of FIG. 8 may represent a headset, in which case the received signal PHIN may be selected for presentation to the user without mixing with an environment signal. The embodiment of FIG. 8 may represent a hearing aid, in which case the received signal PHIN may be mixed with an environment signal before presentation to the user (to allow a user to maintain a sensation of the surrounding environment; the same may of course be relevant for a headset application, depending on the use-case). Further, in a hearing aid, the processor (PRO) may be configured to compensate for a hearing impairment of the user of the hearing device (hearing aid).

It is intended that the structural features of the devices described above, either in the detailed description and/or in the claims, may be combined with steps of the method, when appropriately substituted by a corresponding process.

As used, the singular forms "a." "an." and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure.

The previous description is provided to enable any person skilled in the art to practice the various aspects described herein. Various modifications to these aspects will be readily apparent to those skilled in the an, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

P-2019-009EP, when published>Oct. 17, 2020
EP3709115A1 (Oticon) 16.09.2020
EP3588981A1 (Oticon) 01.01.2020

The invention claimed is:

1. A hearing aid configured to be worn at or in an ear of a user, the hearing aid comprising:
- at least one input transducer for converting a sound in an environment of the hearing aid to at least one electric input signal representing said sound;
- an own voice detector configured to estimate whether or not, or with what probability, said sound originates from the voice of the user, and to provide an own voice control signal indicative thereof, wherein the hearing aid further comprises:
- a mouth wear detector configured to estimate whether or not, or with what probability, said user wears a mouth wear while speaking, and to provide mouth wear control signal indicative thereof;
- a feature extractor configured to identify acoustic features in the at least one electric input signals indicative of the user's own voice; and
- a memory wherein reference values of said acoustic features extracted from said at least one electric input signal when the user wears the hearing aid and speaks, while not wearing a mouth wear are stored.

2. A hearing aid according to claim 1 comprising a memory wherein differences in reference values of said acoustic features extracted from said at least one electric input signal when the user wears the hearing aid and speaks, while wearing and while not wearing a mouth wear, are stored.

3. A hearing aid according to claim 1 comprising a signal processor for processing said at least one electric input signal, or one or more signals based thereon, and to provide a processed signal.

4. A hearing aid according to claim 3 wherein said signal processor is configured to control processing of said at least one electric input signal, or one or more signals based thereon in dependence of said mouth wear control signal.

5. A hearing aid according to claim 1 comprising an output transducer for converting an electric output signal to stimuli perceivable by the user as sound.

6. A hearing aid according to claim 1 comprising at least two input transducers providing at least two electric input signals.

7. A hearing aid according to claim 1 comprising a transceiver configured to transmit and/or receive audio signals from another device or system.

8. A hearing aid according to claim 1 comprising a keyword detector configured to identify a specific keyword of key phrase in the at least one electric input signal or a signal derived therefrom in dependence of said own voice control signal and said mouth wear control signal.

9. A hearing aid according to claim 8 comprising a voice control interface configured to control functionality of the hearing aid by predefined spoken commands, when detected by said keyword detector.

10. A hearing aid according to claim 1 comprising or being connectable to a user interface allowing the user to indicate a specific kind of mouth wear that the user may occasionally wear.

11. A hearing aid according to claim 1 configured to identify a current location or receive information about a current location from another device and configured to trigger a reminder regarding whether or not a user is currently wearing a mouth wear based on the mouth wear control signal.

12. A hearing aid according to claim 1 wherein the own voice detector and/or the mouth wear detector is fully or partially implemented using a learning algorithm.

13. A hearing aid according to claim 1, wherein the mouth wear comprises a mouthpiece, a face mask, or other face or mouth covering device or item.

14. A non-transitory computer readable medium storing an application, termed an APP, comprising executable instructions configured to be executed on an auxiliary device to implement a user interface for a hearing aid according to claim 1, the APP being configured to exchange data with said hearing aid and to allow the user to indicate a kind of mouth wear that the user might wear, said kind of mouth wear being selectable among a multitude of different types of mouth wears, and to communicate information related the selected mouth wear to the hearing aid.

15. A method of operating a hearing aid configured to be worn at or in an ear of a user, the method comprising:
converting a sound in an environment of the hearing aid to at least one electric input signal representing said sound;
estimating whether or not, or with what probability, said sound originates from the voice of the user, and providing an own voice control signal indicative thereof; and
estimating whether or not, or with what probability, said user wears a mouth wear while speaking, and to providing a mouth wear control signal indicative thereof;
wherein the method further comprises:
identifying acoustic features in the at least one electric input signals indicative of the user's own voice; and
storing in memory reference values of said acoustic features extracted from said at least one electric input signal when the user wears the hearing aid and speaks, while not wearing a mouth wear.

16. A hearing aid configured to be worn at or in an ear of a user, the hearing aid comprising:
at least one input transducer for converting a sound in an environment of the hearing aid to at least one electric input signal representing said sound;
an own voice detector configured to estimate whether or not, or with what probability, said sound originates from the voice of the user, and to provide an own voice control signal indicative thereof,
wherein the hearing aid further comprises:
a mouth wear detector configured to estimate whether or not, or with what probability, said user wears a mouth wear while speaking, and to provide mouth wear control signal indicative thereof, wherein
the hearing comprises at least two input transducers providing at least two electric input signals,
the hearing aid comprises an own voice beamformer configured to provide an estimate of the voice of the user in dependence of said at least two electric input signals and configurable beamformer weights of the own voice beamformer, and
the hearing aid comprises a signal processor configured to process said estimate of the voice of the user in dependence of said mouth wear control signal, and to provide an improved estimate of the voice of the user.

17. A hearing aid according to claim 16 wherein the signal processor is configured to modify the frequency shape of the user's own voice in dependence of said mouth wear control signal and to provide said improved estimate of the voice of the user.

* * * * *